Aug. 18, 1953  P. D. SCHNELLE  2,649,013
APPARATUS FOR REFRACTOMETRY
Filed June 5, 1950  3 Sheets-Sheet 1

INVENTOR.
PHILIP D. SCHNELLE
BY Herman O. Bauermeister
Attorney

Aug. 18, 1953 P. D. SCHNELLE 2,649,013
APPARATUS FOR REFRACTOMETRY
Filed June 5, 1950 3 Sheets-Sheet 3
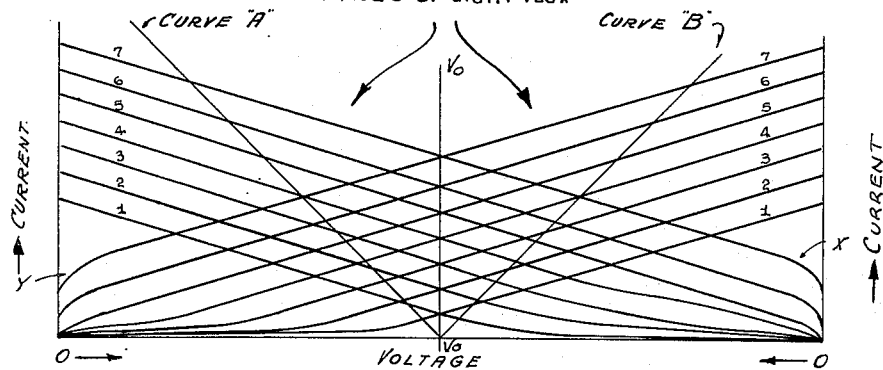
FIG. 7
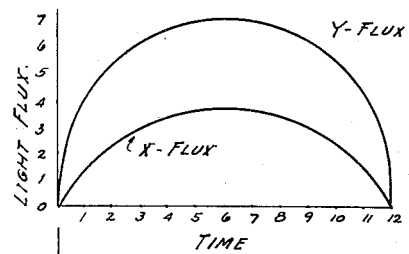
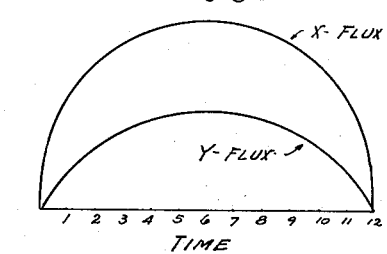
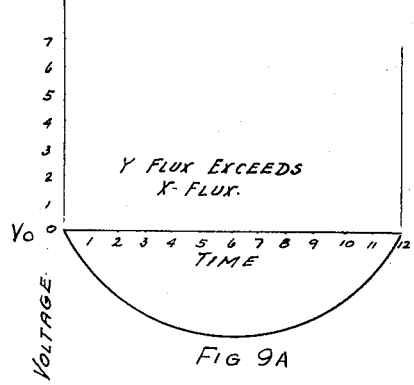
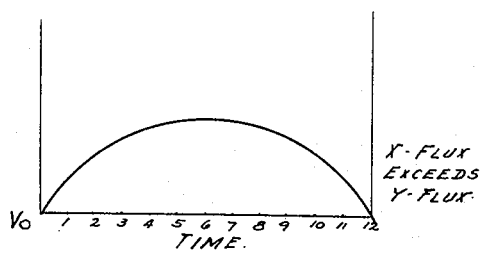
INVENTOR.
PHILIP D. SCHNELLE
BY Herman O. Bauermeister
Attorney

UNITED STATES PATENT OFFICE 2,649,013

APPARATUS FOR REFRACTOMETRY

Philip D. Schnelle, Texas City, Tex., assignor to Monsanto Chemical Company, St. Louis, Mo., a corporation of Delaware Application June 5, 1950, Serial No. 166,237

3 Claims. (Cl. 88—14)

This invention relates to the art of refractometry and particularly to apparatus useful therefor. An object of the invention is to improve refractometric devices by means of light tracking system which avoids errors heretofore inherent in the measurement of refractive index. A further object is to provide a new refractometric device.

In the measurement of refractive index of fluids in industrial processing it has been a disadvantage that the fluids are subjected to variations in composition or temperature, resulting in optical non-homogeneity. For example, when a narrow monochromatic beam of light is passed through a prism containing a sample of such a liquid, instead of obtaining a narrow ribbon of light after passage through the prism, the resultant beam of light may broaden as much as one hundred times, so that the measurement of the exact position of such a light beam is very difficult. It has not been possible by means of the prior art devices to determine the optical center of such a broad beam of light so that measurements depending upon the determination of the location of the beam of light have failed when the test sample utilized in refractive index measurements has consisted of variable mixtures, and mixtures subject to rapid and indeterminate changes in color, chemical constitution and temperature, such as in the variation of one constituent in a mixture of materials.

Prior art refractometric instruments have endeavored by an on-or-off system to follow a beam of light in the determination of its position as a measure of refractive index. Such instruments have been found to be impractical since they are seriously affected by the width of the light beam. For example, a device has been described in which a narrow beam of light is directed to either of two closely-adjacent, rectangular, light-receiving elements, such individual elements being connected to respective individual actuating means which can direct the moving portions of the instrument in one direction or the other in accordance with the signal impressed upon one or the other light-receiving element. It has been found, however, that in the industrial use of refractometric instruments it is impossible to prevent the beam of light from becoming broadened and therefore shining upon both of the receiving units. Such conditions may be the result of temperature changes or the lack of homogeneity of the test sample, both of which conditions are common and inescapable in technical work.

The above-described type of instrument, therefore, fails to operate when subjected to varying temperature of the test liquid, or to lack of homogeneity. Thus, the light beam broadens under such conditions even when the temperature changes involved amount only to small fractions of a degree. In such instances, because of the broadening of the beam of light incident upon the light-sensitive system, it has been found that instead of shining upon one or the other of the light-receiving elements, that the light beam instead broadens to shine upon both of the light-receiving elements at the same time. Under such circumstances, the electrical system which is operated in conjunction with the light-receiving system cannot determine whether it shall move in one direction or the other, so that the resultant effect cannot be predicted, and the instrument may move in a completely contrary direction to that which would be expected from the physical characteristics of the liquid being tested. Accordingly, when such instruments are utilized in precise work they may be subjected to gross errors amounting to several hundred percent, or if utilized in control applications they may operate in a completely contrary manner to that which would be required by the change causing the broadening of the light beam. From the viewpoint of the optical system involved, it may be said that such prior art devices which utilized two rectangular, light-sensitive elements in which the light would shine upon one or the other individually, suffered from the disadvantage that they had only a finite resolution and that such finite resolution greatly limited the scope of the instrument. Accordingly, the instrument can only be considered to be a rudimentary attempt in the problem of providing a practical recording and controlling refractometer.

It has been found that a refractometer may be constructed in which light from a beam, subject to angular deviation as the result of changing in refractive index, may be impressed upon light-sensitive elements which are in reciprocal relationship, so that when deviation of the light beam results in an increase in the amount of light upon one of the light-sensitive elements, there is found to be a decrease in the amount of light received by the other of the pair of light-sensitive elements. It has been found that under such a positive system, a narrow beam of light cannot be lost completely since light shines at all times upon each of the said reciprocal light-receiving elements. This apparatus is therefore capable of far greater accuracy, particularly when utilized in conjunction with the improved process in which the light-receiving means are operated in combination with electrical means to give a characteristic electrical voltage or signal.

The improvement described above in the apparatus for using reciprocal light-receiving elements in refractometry is the subject matter of copending application Serial No. 794,004, filed December 26, 1947, and assigned to the same assignee as is the present application.

The above apparatus has now been improved by the present invention relating to an apparatus in which the voltage received from the unbalance sensing means is varied in phase for different conditions of unbalance between the light beam and the light beam position sensing system. This voltage is employed to actuate a restorative system to achieve a balance between the light beam position sensing system and the light beam. The position of the light beam sensing system is then a direct measure of the refractive index of the material which is being passed through the prism.

The invention will be described in greater detail in conjunction with the drawings which illustrate typical diagrammatic and semi-diagrammatic arrangements of apparatus which may be used to carry out the process of the present invention.

In the accompanying drawings, in which an embodiment of the invention is illustrated, Figure 1 is a diagrammatic view of the refractometric apparatus with certain of the parts broken away.

Figure 2 is a diagram of the electrical system of the refractometer.

Figures 3, 4, 5, and 6 show the relation of the light beam at various positions in relation to the reciprocal light-sensitive elements.

Figure 7 represents the plate characteristics of the two photo tubes in a series circuit.

Figure 8A shows the variation in light flux with time where the Y flux exceeds the X flux.

Figure 8B shows the variation in light flux with time where the X flux exceeds the Y flux.

Figure 9A represents the voltage output to the servo amplifier under the conditions shown in Figure 8A.

Figure 9B represents the voltage output to the servo amplifier under the conditions shown in Figure 8B.

Figure 1:
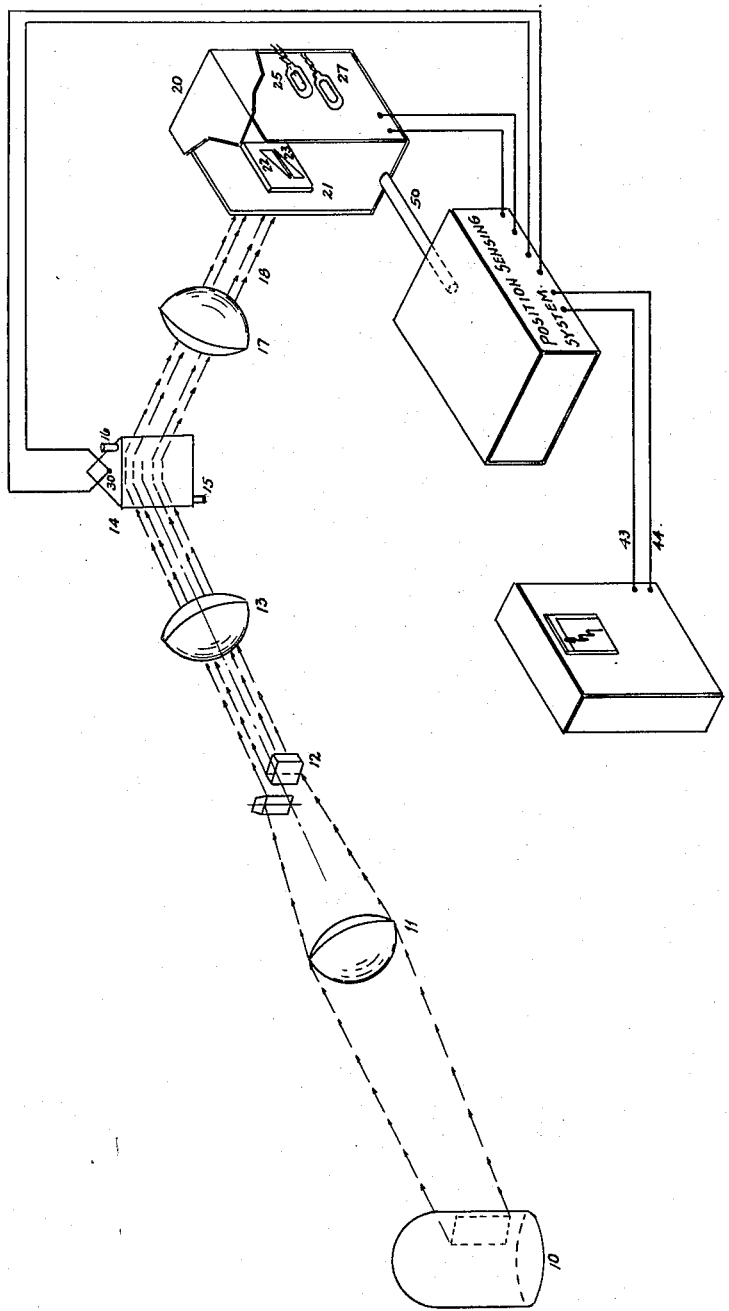

Referring to Figs. 1 to 9, inclusive, the device embodying the present invention comprises in general, as shown in Fig. 1, a light source, preferably monochromatic, 10 emits a beam of modulated light, or a continuous light interrupted by means of a mechanical chopper. The beam of light is passed through a condensing lens 11, a slit 12, which may be adjusted or fixed as desired, and a collimating lens 13 to reach the prism system. While I may employ a single prism 14, I can also take advantage of the greater deviation which is made possible by the use of a plurality, such as the pair of prisms. The prisms may be provided with a temperature control system, whereby the temperature of the fluid entering the prism at 15, and leaving at 16, may be maintained constant throughout the measuring period. From the prism the refracted light passes through the condensing lens 17 as a narrow ribbon 18 and enters the detection and tracking system.

The light detection system includes a housing 20 and a slit plate holder or wedge mask 21, on which is mounted a slit system such as the two similar and reciprocal wedge slits, 22 and 23. This entire unit comprising the housing, slit plate holder or wedge mask and reciprocal wedge slits is hereinafter referred to as the "tracker." Other reciprocal light elements may also be utilized. The beam of light 18 entering the slit system is there divided into two parts which proceed respectively from said slits to an upper light-responsive cell 25, and another light-responsive cell 27. However, the light-responsive elements may also be situated in a unitary case, such as a twin element photocell. Prisms or mirrors may be employed to direct the light beam. It is also possible to mount the reciprocal slits or wedges in fixed relationship as a unit with the light-responsive cells.

The reciprocal light openings or slits 22 and 23 are situated across the path or sweep of the ribbon of light leaving the prism. Consequently, the angular displacement of the light as the refractive index changes, results in a sweeping of the ribbon across the light openings or slits. However, it is essential that some light pass to each one of the two openings regardless of the angularity of the light ribbon. The reciprocal relation thus obtains throughout the possible light-sweep area, i. e., that a gain in light to one slit is accompanied by a corresponding loss of light to the other.

It is particularly important that the separation zone between the light-receptive photoelectric elements be non-parallel and preferably perpendicular with the plane of the ribbon of light. This condition is necessary so as to have some light enter each of said light-receptive units at all positions of the sweeping light beam. Thus, the instrument is operative, even if the beam swings very suddenly, whereas a separation zone parallel to the ribbon could be missed entirely in a sudden swing too rapid for the instrument to follow.

Another advantage of the angularly inclined slit is that variations in image width are of minor effect, since the reciprocal relation of the light-receiving portions assures a clearly measurable effect. Even small changes in position of the ribbon of light 18 are accurately detected. Because of the differential nature of the change in light flux on the individual elements, the tracker has theoretically infinite resolution. Very narrow ribbons of light, 18, which are desirable to preserve accuracy in the lens system, may also be used since the reciprocal elements are adapted to any width of the ribbon or beam.

By separating the light-receptive units by means of the above-described reciprocal elements 22 and 23, it is possible to isolate the photocells. This is advantageous since light-proof housings may then be used for the individual photoelectric cells; consequently, the effect of stray light may be reduced since it is possible to direct the light beams or ribbons through a mirror system from the respective reciprocal slits or openings 22 and 23 to the ultimate photoelectric cells. Another advantage of this system is that more sensitive cells may be utilized, since such cells are not subject to stray light but are completely shielded except for the above-described reciprocal portions of the light ribbon.

Such an apparatus utilizing the principle of the invention also makes it possible to provide a more rugged form of apparatus for industrial applications.

Figure 2:
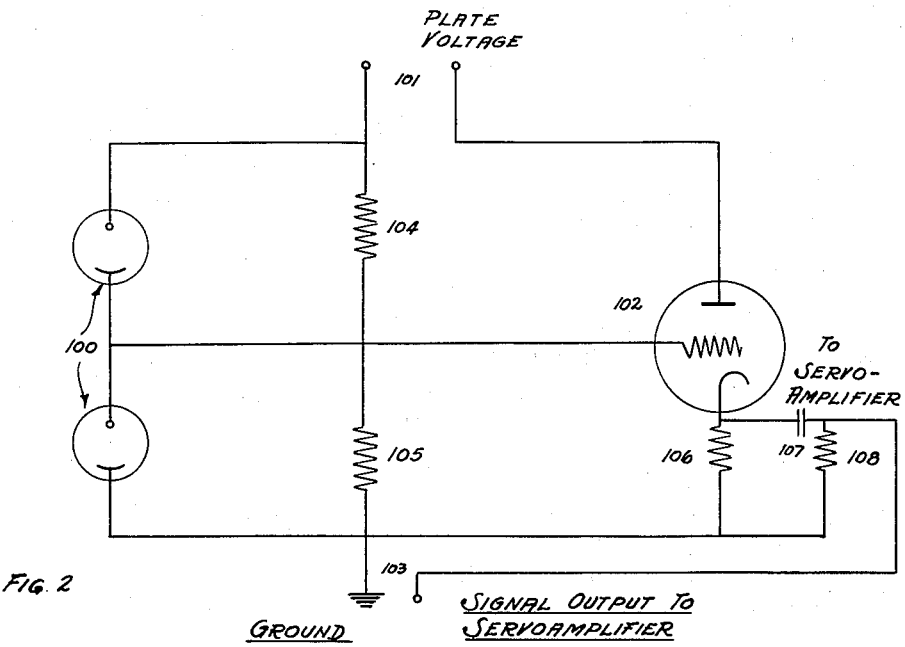
Figure 3:
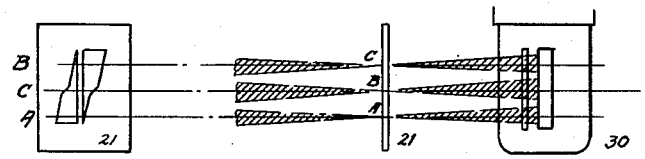

Fig. 2 shows in diagrammatic form a typical circuit which may be employed in carrying out the process of the present invention. The circuit shows an embodiment by means of which the light receiving means or photoelectric cells may be connected to obtain a signal which may then be employed as an electrical effect or signal output to the servo amplifier, which may then operate restorative means for the measurement of the refractive index of a test liquid. In Fig. 2, 100 represents light-sensitive elements, such as a pair of photoelectric cells, although it is also feasible to employ a dual type photoelectric cell in which two receiving units are employed in the same envelope. In such latter circuit, however, it is necessary that an anode and cathode be connected, and that an intermediate lead be available in the said connection between the anode and cathode. The remaining two terminals from the photoelectric cell system, namely, the remaining anode and the remaining cathode, are then connected in the circuit as shown in Fig. 2. A plate voltage is introduced into the circuit at 101. The circuit also includes a vacuum tube 102 as a cathode follower voltage amplifier. It is desirable that tube 102 be located in close proximity to the photoelectric cells. The circuit terminates at 103 to provide a signal output to the servo amplifier, although one of the two electrical leads at 103 may be grounded. The remainder of the circuit shown in Fig. 2 comprises elements 104 and 105 which are large resistors to function in controlling the sensitivity of the circuit and to overcome the diode action of the phototubes. In addition, a load resistor 106 is employed in connection with the vacuum tube to function as a cathode follower. Element 107 is a coupling condenser and 108 is the grid resistor for the vacuum tube.

The light-sensitive elements are preferably of the type designated as conductivity and emission type phototubes, although the barrier type of tube or self-generating type may also be employed when suitable modifications are made in the electrical circuit.

The mode of operation of the entire apparatus may be summarized by following a change in refractive index in the fluid flowing through the prism system. The consequent change in refraction or bending of the light beam results in a difference in the relative voltage outputs from the two photocells. In the preferred embodiment of the invention, as shown in Fig. 1, the change in the photocell readings creates an unbalance which is amplified. The amplified signal may also be used to effect movement of a drive motor by conventional means, such as a thyratron circuit, or vacuum tube current amplifier tubes. Movement of the drive motor is then utilized to displace the light receiving elements, such as the unitary assembly of the wedge slits and photocells. The motor movement thus restores the system to a state of balance. The magnitude of the displacement may also be indicated as a change in refractive index of the test fluid, giving a direct dial reading or chart record of refractive index.

The principle underlying the tracking or following of the angular deviation of the light beam is set forth in fuller detail below.

Figure 4:
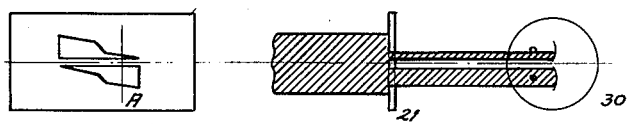
Figure 5:
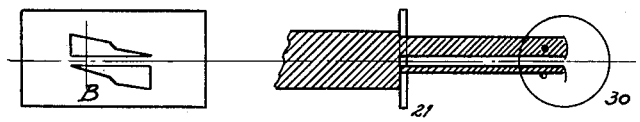
Figure 6:
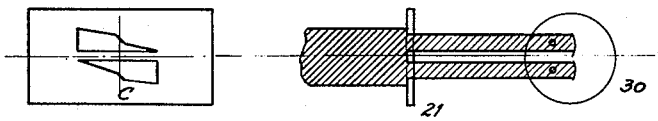

Tracking of the light beam is accomplished by means of a servo-actuated, photo-mechanical device which has been found to be capable of operating with high sensitivity and stability. The light beam, before it impinges on the phototube surfaces, is divided into two portions by reciprocal optical wedge masks or slits shown in Fig. 1. The two portions of the radiation strike two different phototube elements, which, however, may be contained in the same glass envelope. The distribution of the light flux between the two phototube elements is determined by the position of the light beam with respect to the reciprocal wedge mask. For example, referring to Fig. 3, the left illustrations represent a view of the wedge mask 21 with the ribbon of light at positions A, B and C. This is shown in a top view, while the drawing at the right illustrates how such beams pass through the wedge mask 21 (shown in a side view) to impinge upon a unitary phototube 30 having a pair of anodes and cathodes. The next horizontal series, Fig. 4, illustrates the position of the light beam at position A when more light will strike the bottom cathode than the top cathode. At position B, Fig. 5, represented by the third line, the opposite is true; more light will strike the top cathode than the bottom cathode. When the beam is in the middle of the reciprocal optical wedge mask (position C), shown in Fig. 6, an equal amount of light will strike both cathodes.

In principle, the wedge masks or slits could be two identical right triangles or other symmetrical geometric figures. It is desirable, however, that the geometry of the slit be such that the sensitivity per unit of horizontal motion is high at only one region on the slit face. Thus the slopes along the hypotenuse of a wedge slit may be conservative at all points except for a small region near the center where the slope should be large to give greater sensitivity of tracking. The slope of this middle section can be made large if the sensitivity of tracking is desired to be very high.

The next step in the operation of the tracking system in following angular deviations of the light beam resulting from variations in refractive index of the test fluid is to provide an electrical signal. After the sensing element of the tracking means, namely, the wedge mask or slit system in combination with the phototube, has been affected by the angular deviation of the light beam, the tracking device of the present invention serves to introduce into the electronic circuit, such as an amplifier, a phased unbalance signal which is used to actuate the servomotor to restore the servo mechanism to balance. The phasing is accomplished by the use of the reciprocal optical wedge mask or slit in conjunction with a plurality of light detecting means such as a series phototube circuit, employed in conjunction with a modulating source of radiation.

Referring to the discussion above with reference to Figs. 3–6, concerning the variation in light flux falling upon the individual light-sensitive elements, assume, for example, that there is a potential of 100 volts placed on the anode of the top phototube of the two phototubes wired in series. When both tubes are receiving the same amount of light (regardless of the absolute magnitude of the total light flux) the voltage at the midpoint, or the electrical connection intermediate to the anode and cathode connected in series between the two tubes will be 50 volts, assuming that both tubes have substantially identical electrical characteristics. Similarly, if the top tube were to receive twice the light which the bottom tube received, its resistance would be less than that of the bottom tube and the voltage drop across the tube would be less. Assuming linear operation of the tubes, the voltage of the intermediate point would be 66.6 volts above ground. This voltage also is independent of the total value of light flux and is a function only of the difference in the light on each tube. The total light flux in this instance determines the static resistance of the tubes. It is the difference of these two static resistances that gives the signal. The difference in the amounts of light falling on the two phototubes is determined only by the position of the light beam on the optical wedge mask or slit assembly. It is essential in the utilization of the phase characteristic method of the present invention that the light source be a modulated one such as a mercury or a sodium lamp which totally extinguishes itself two times a cycle. The amplitude or light flux obtained as a difference thus results from the difference in the opening or aperture of the wedge situated in front of the light-receptive tube. As a result of the differences of light flux received by the individual light-receptive units and the phase relationships set up by the series tubes a motion of the wedge system in one direction or the other is obtained to return the system to the null balance. The magnitude of this return or restorative motion gives a measure of the refractive index.

Fig. 7 represents the idealized plate characteristics of two phototubes in a series hookup. Tube Y is the lower tube and tube X is the top tube drawn with its voltage axis reversed in the manner of a conventional load line of a vacuum tube.

Fig. 7 represents the voltage current relationships of the two photoelements. In each of the groups of curves 1–7, the lines 1–7 are "representations of current at various values of light flux." For these various conditions the current and voltage are given in the conventional manner. Furthermore, the vertical line $V_0$ represents the condition at which the voltages are the same for the respective photoelements.

Figures 8A and 8B represent the light flux at a condition of unbalance for a modulated light source plotted on an arbitrary time axis. The units of the light flux are arbitrary but are maintained the same as those for the light flux lines in Fig. 7. In one case the Y-flux predominates, and in the second case the X-flux predominates.

It is now possible to determine the voltage at the point between the photocells at any time, $t$, for the flux relation shown in Figures 8A and 8B. This may be done by determining the light flux at any time, $t$, for X and Y and noting the intersection of the lines corresponding to these flux values in Fig. 7. The intersections of these lines will determine the current and the voltage existing at the point between the photocell system. A plot of the first case in Fig. 8A, where the Y tube flux exceeds the X flux, yields curve A in Fig. 7; and a plot of the second case in Figure 8B, where the X flux exceeds the Y flux, yields curve B in Fig. 7. When the voltage of the point between the photocells is plotted against time, it yields Figures 9A and 9B. These positive or negative D. C. voltage fluctuations contain an alternating voltage fundamental, the phase of which differs by 180 electrical degrees. By this method there is provided a means of obtaining an alternating voltage which is proportional to the distance of the light beam from the balance point of the optical wedge mask-phototube system, and the phase of alternating voltage is a measure of the direction of the unbalance. Having obtained a phase-sensitive, alternating-voltage signal, it is possible to construct the tracking servo-mechanism by known techniques.

When the alternating voltage signal, characterized as to phase, has been obtained, it may then be utilized to restore the light-receiving assembly by various means, such as a rigid rod, 50 of Fig. 1, or a carriage utilizing a cable drive actuated by a reversible motor; or another method which may be employed to restore the light-receiving assembly to a null-balance position is described in the above-mentioned copending application, Serial No. 794,004, filed December 26, 1947, and assigned to the same assignee as is the present patent application.

Since many changes could be made in the above methods and apparatus without departing from the scope of the invention, it is intended that all matter contained in the above description shall be interpreted as illustrative and not in a limiting sense, and that the invention is to be construed broadly.

What I claim and desire to protect by Letters Patent of the United States is:

1. A refractometer for transforming changes in refractive index of a fluid into an electric signal, which comprises in combination, a source of modulated radiation, a hollow prism and means for passing a fluid therethrough, means for directing a collimated beam of radiation from said source through said hollow prism, means for imaging the beam upon two light-receiving units which are in reciprocal and fixed positional relation to each other such that a null balance point exists where the beam of light falls equally upon the two receiving units and such that a deviation of said beam from this point results in a gain of light to one unit and a decrease of light to the other, said receiving units including means for changing the light differences obtained when the beam is subjected to deviation from said point of null balance, due to changes in refractive index of said fluid, into a fluctuating electric voltage impressed upon a carrier of direct electric voltage, means for removing the said fluctuating electric voltage as an alternating voltage component, and means for applying the alternating voltage component to restore the two receiving units to the position of null balance, the position of which corresponds to a value of refractive index.

2. A refractometer for transforming changes in refractive index of a fluid into an electric signal, which comprises in combination, a source of modulated radiation, a hollow prism, and means for passing a fluid therethrough, means for directing a collimated beam of radiation from said source through said hollow prism, means for imaging the beam upon two light-receiving units which are in reciprocal and fixed positional relation to each other such that a null balance exists where the beam of light falls upon a predetermined point upon the two receiving units and such that a deviation of said beam from this point results in a gain of light to one unit and a decrease of light to the other, said receiving units including means for changing the light differences obtained when the beam is subjected to deviation from said point of null balance, due to changes in refractive index of said fluid, into a fluctuating electric voltage impressed upon a carrier of direct electric voltage, means for removing the said fluctuating electric voltage as an alternating voltage component, and means for applying the alternating voltage component to restore the two receiving units to the position of null balance, the position of which corresponds to a value of refractive index.

3. A refractometer for transforming changes in refractive index of a fluid into an electric signal, which comprises in combination, a source of modulated radiation, a hollow prism and means for passing a fluid therethrough, means for directing a collimated beam of radiation from said source through said hollow prism, means for imaging the beam upon two photocell means which are in reciprocal and fixed positional relation to each other such that a null balance point exists where the beam of light falls equally upon the two photocell means and such that a deviation of said beam from this point results in a gain of light to one photocell and a decrease of light to the other, said photocell means including means for changing the light differences obtained when the beam is subjected to deviation from said point of null balance, due to changes in refractive index of said fluid, into a fluctuating electric voltage impressed upon a carrier of direct electric voltage, means for removing the said fluctuating electric voltage as an alternating voltage component, and means for applying the alternating voltage component to restore the two photocell means to the position of null balance, the position of which corresponds to a value of refractive index.

PHILIP D. SCHNELLE.

References Cited in the file of this patent
UNITED STATES PATENTS

| Number | Name | Date |
|---|---|---|
| 1,936,400 | Langmuir | Nov. 21, 1933 |
| 2,016,036 | Gerald | Oct. 1, 1935 |
| 2,065,365 | Doyle et al. | Dec. 22, 1936 |
| 2,065,758 | Shepard | Dec. 29, 1936 |
| 2,136,682 | Gilbert | Nov. 15, 1938 |
| 2,413,208 | Barnes | Dec. 24, 1946 |
| 2,439,373 | Stearns | Apr. 6, 1948 |
| 2,444,442 | Herbold | July 6, 1948 |
| 2,446,628 | Brown | Aug. 10, 1948 |
| 2,452,122 | Gumaer | Oct. 26, 1948 |
| 2,483,102 | Pierson | Sept. 27, 1949 |